June 18, 1929.   I. H. SPENCER   1,717,471
OUTLET FIXTURE FOR PNEUMATIC SYSTEMS
Filed July 6, 1925
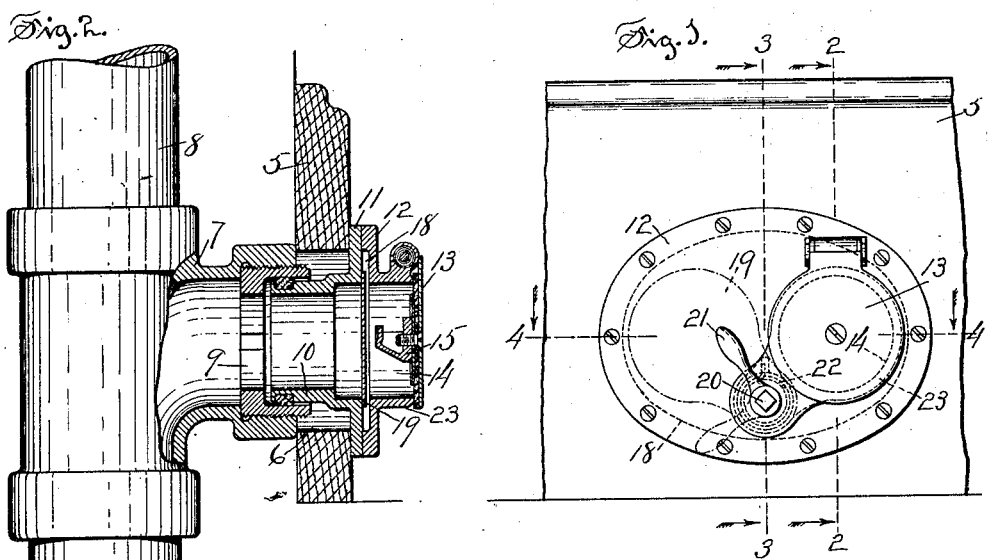
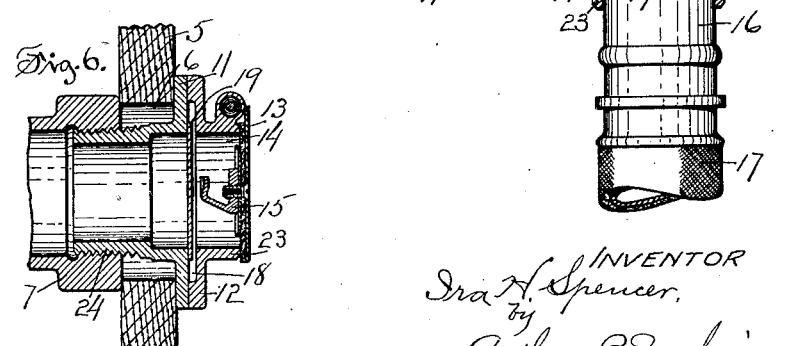
INVENTOR
Ira H. Spencer,
by Arthur B. Jenkins,
ATTORNEY Patented June 18, 1929.

1,717,471

UNITED STATES PATENT OFFICE.

IRA H. SPENCER, OF WEST HARTFORD, CONNECTICUT.

OUTLET FIXTURE FOR PNEUMATIC SYSTEMS.

Application filed July 6, 1925. Serial No. 41,695.

My invention relates more especially to outlet fixtures for pneumatic system, to which outlets lengths of hose are attached, especially as to such system when employed for pneumatic cleaning purposes, and an object of my invention, among others, is the production of an outlet fixture to which a hose may be attached and from which it may be detached without undue noise caused by the rapid inrush of air when the outlet is opened.

One form of fixture embodying my invention and in the construction and use of which the objects herein set out, as well as others, may be attained, is illustrated in the accompanying drawings, in which—

Figure 1 is a face view of a fixture embodying my invention.

Figure 2 is a view partially in vertical section on a plane denoted by the dotted line 2—2 of Figure 1, and further, illustrating a portion of a pneumatic system.

Figure 3 is a view on a plane denoted by the dotted line 3—3 of Figure 1.

Figure 4 is a view on a plane denoted by the dotted line 4—4 of Figure 1, and further, illustrating a hose attached to the fixture.

Figure 5 is a view similar to Figure 4, but illustrating the manner of operation in removing a hose from the fixture.

Figure 6 is a detail view in central section through a little different form of the device.

It is a common practice at the present time to install in buildings a pneumatic system comprising conduits having outlets therefrom at different points throughout the building, and to which outlets hose having pneumatic cleaning implements are attached, the conduits being connected with an apparatus for reducing the pressure within such conduits whereby an inrush of air is caused at the mouths of the cleaning tools. These outlets are commonly provided with valves that are closed when a hose is not attached. Whenever said valves are opened a loud whistling noise occurs, by reason of the rapid inrush of air into the opening, such noise being occasioned when the valve is opened for attachment of the hose, or when the hose is disconnected from the outlet. This noise is very objectionable, and especially when the system is installed in buildings like hospitals and similar places where quiet is desirable.

In order to overcome this objection I have provided an outlet fixture by means of which a hose employed for cleaning purposes may be attached to the fixture, or detached therefrom, without any noise in accomplishing this purpose, such a fixture being illustrated in the drawings herein in which the numeral 5 indicates a baseboard of a room having an opening 6 therein to which my improved fixture is applied, said fixture extending through said opening and being connected with a T 7 of a conduit 8 forming a part of a pneumatic system, as hereinabove described. A union 9 is secured within an opening in the lateral projection of the T 7 and an inner member 10 of a valve casing is attached to this union, extending through the opening 6 and having a face plate 11 resting against the outer face of the baseboard 5. An outer member 12 of the valve casing is secured to the inner member in any suitable manner, this outer member having a valve 13 pivotally attached thereto, preferably at the upper side thereof and adapted to be swung downwardly to close the outlet opening 14 into the valve casing. A retainer 15 of any ordinary construction may be secured to the inner face of the valve 13 for engagement with a rib on a hose tip 16 of a hose 17, which hose is of suitable length and which, in use, will have a pneumatic cleaning implement of well known construction attached to its opposite end.

A valve chamber 18 is formed within the valve casing, this chamber being preferably of elongated form and having a silencing valve 19 pivotally mounted therein as upon a spindle 20 rotatably mounted in the casing and to which spindle may be attached at its outer end a handle 21 as a means for operating the valve.

It will be noted that the opening into the fixture and extending therethrough into the conduit 8 is located at one side of the valve casing and of the chamber 18 therein so that the silencing valve 19 may be swung to one side to uncover the passage extending to the conduit 8. This valve casing is provided with means for the attachment of the end of a hose in such manner that the opening 14 into and through said casing will never be opened to the passage of air, in the ordinary use of the device, except through a length of hose attached thereto, that is, said opening or air passage will always be closed to the flow of air from the outside, and the objectionable whistling noise incident to the inflow of air except through a hose will be eliminated. In effecting this purpose I so construct the parts that the hose or its attaching end or tip will close and seal the air passage before air is admitted through the hose, and, conversely, the flow of air through the hose will be shut off before it is detached from the casing.

In the special means herein shown for accomplishing this purpose I provide a nipple 23 projecting from the front of the face plate of the casing, and to the outer end of which the valve 13 is attached, this preferably being a flap valve to close the opening or air passage 14 into the nipple, and through the valve casing hereinbefore referred to.

The valve 19 is provided with a closing spring 22, and the provision of the nipple spaces the valves 13 and 19 so far apart that it is practically impossible to remove the end of the hose from the nipple before the silencing valve will be closed by its spring, and thereby insure that the air passage 14 will be closed by the valve 19 before the hose is disconnected from the nipple, and, conversely, there is sufficient length of passage in the nipple to enable the hose to be inserted and completely close and seal the passage 14 before the valve 19 is opened, in both cases the whistling noise hereinbefore mentioned being prevented.

In the structure shown in Figure 6 of the drawings the inner member of the valve casing, denoted in this figure by the numeral 24, is secured directly to the T 7 instead of being attached to a union, as shown in the preceding figures.

In accordance with the provisions of the patent statutes I have described herein the principles of operation of my invention, together with the device which I now consider to represent the best embodiment thereof, but I desire to have it understood that the device shown is only illustrative and that the invention may be carried out by other means and applied to uses other than those above set out.

I claim—

1. A pneumatic outlet fixture having an air passage therein, means for attachment of a hose to said fixture, a valve for controlling the opening into said fixture, a valve located within the passage at a distance from the mouth thereof for controlling flow of fluid through said fixture and forming an abutment to the insertion of the hose, and said hose acting to hold the same in open position, and automatic means for closing said last mentioned valve upon removal of the hose.

2. A pneumatic outlet fixture having an air passage therein, means for attachment of a hose to said fixture, means for closing the mouth of said fixture, a valve located within the passage at a distance from the mouth thereof to control flow of fluid through said fixture and forming an abutment to the insertion of the hose, said hose acting to hold the same in open position, means accessible outside of the fixture for manual operation of the valve, and means within the fixture for automatically closing said valve upon removal of the hose.

3. A pneumatic outlet fixture having an air passage therein, a valve in said passage at a distance from the mouth thereof and movable transversely across said passage for controlling flow of air through said air passage, means for attachment of a hose to said fixture and to permit insertion of the hose beyond the path of movement of said valve, and automatically actuated means for closing said valve.

4. A pneumatic outlet fixture having an air passage therein, a valve movable in said fixture across the passage to control flow of air therethrough, means for automatically closing said valve, means for attachment of a hose within said passage to a point beyond the point of movement of said valve, and means for closing the mouth of said fixture.

5. A pneumatic outlet fixture having an air passage therein, a valve pivotally mounted within said fixture and movable across the passage to control flow of air therethrough, a spring encircling said pivot for automatically closing said valve, means for attachment of a hose to said fixture, said valve forming an abutment to the insertion of the hose, and said hose acting to hold the same in open position, and a valve for closing the opening into said fixture.

IRA H. SPENCER.